US006113973A

United States Patent [19]
Cook et al.

[11] Patent Number: 6,113,973
[45] Date of Patent: Sep. 5, 2000

[54] EGGS ENRICHED WITH CONJUGATED LINOLEIC ACID

[75] Inventors: Mark E. Cook; Rahim Aydin; Michael W. Pariza, all of Madison, Wis.

[73] Assignee: Wisconsin Alumni Research Foundation, Madison, Wis.

[21] Appl. No.: 09/060,588

[22] Filed: Apr. 15, 1998

[51] Int. Cl.[7] .................................. A23K 1/18; A23L 1/32
[52] U.S. Cl. .............................. 426/614; 426/2; 426/807
[58] Field of Search .................................. 426/614, 807, 426/2

[56] References Cited

U.S. PATENT DOCUMENTS

| | | | |
|---|---|---|---|
| 4,282,265 | 8/1981 | Theuer | 426/607 |
| 4,603,142 | 7/1986 | Burger et al. | 514/456 |
| 4,868,001 | 9/1989 | Maruta | 426/623 |
| 5,045,338 | 9/1991 | Klemann et al. | 426/611 |
| 5,068,119 | 11/1991 | Klemann et al. | 426/601 |
| 5,070,104 | 12/1991 | Pariza et al. | 514/549 |
| 5,162,337 | 11/1992 | Elbrecht et al. | 514/300 |
| 5,246,717 | 9/1993 | Garwin | 426/614 |
| 5,428,072 | 6/1995 | Cook et al. | 514/560 |
| 5,430,066 | 7/1995 | Cook et al. | 514/558 |
| 5,470,839 | 11/1995 | Laughlin et al. | 514/53 |
| 5,504,114 | 4/1996 | Cook et al. | 514/558 |
| 5,554,646 | 9/1996 | Cook et al. | 514/560 |
| 5,760,082 | 6/1998 | Cook et al. | 514/560 |
| 5,760,083 | 6/1998 | Cook et al. | 514/558 |

FOREIGN PATENT DOCUMENTS

| | | |
|---|---|---|
| 0 594 862 A1 | 5/1994 | European Pat. Off. . |
| 1476511 | 4/1967 | France . |
| 61-216658 | 9/1986 | Japan . |
| 6-276939 | 10/1994 | Japan . |
| WO90/09110 | 8/1990 | WIPO . |
| WO92/10105 | 6/1992 | WIPO . |

OTHER PUBLICATIONS

Ha et al., "Anticarcinogens from Fried Ground Beef: Heat–Altered Derivatives of Linoleic Acid", *Carcinogenesis* 8(12):1881–1887 (1987).
Ha et al., "Newly Recognized Anticarcinogenic Fatty Acids: Identification and Quantification in Natural and Processed Cheeses", *J. Agric. Food Chem.* 37:75–81 (1989).
Noble R.C. and J.H. Shand, "Unsaturated Fatty Acid compositional Changes and Desaturation During the Embryonic Development of the Chicken (*Gallus domesticus*)", *Lipids* 20(5):278–282 (1985).
Noble R. C. and J.H. Moore, "The Transport of Phospholipids from the Yolk to the Yolk–Sac Membrane During the Development of the Chick Embryo", *Canadian J. of Biochem.* 45:1125–1133 (1967).
Pariza, M. W., "What's New (and Old) About CLA", *Food Research Institute 1988 Annual Fall Meeting* (Oct. 1988).
Shand et al., "The Esterification of Cholesterol in the Yolk Sac Membrane of the Chick Embryo", *Lipids* 28(7):621–625 (1993).
Speake et al., "Tissue–Specific Changes in Lipid Composition and Lipoprotein Lipase Activity During the Development of the Chick Embryo", *Biochimica et Biophysica Acta* 1165:263–270 (1993).
Vilchez et al., "Effect of Feeding Palmitic, Oleic, and Linoleic Acids to Japanese Quail Hens (*Coturnix coturnix japonica*)–Reproductive Performance and Tissue Fatty Acids", *Poultry Science* 70:2484–2493 (1991).
Yafei, N. and R. C. Noble, "Further Observations on the Association Between Lipid Metabolism and Low Embryo Hatchability in Eggs from Young Broiler Birds", *J. Experimental Zoology* 253:325–329 (1990).
*The Merck Index: An Encyclopedia of Chemicals, Drugs and Biologicals– Tenth Edition*, edited by Marth Windholz et al., Merck & Co., Inc. N.J. (1983).
*The Merck Veterinary Manual: A Handbook of Diagnosis and Therapy for the Veterinarian–Fifth Edition*, edited by Otto Siegmund et al., Merck & Co., Inc. N.J. (1979).
*Nutrient Requirements of Poultry–Ninth Revised Edition*, National Academy Press (1994).
Belury, M.A. and Anna Kempa–Steczko, "Conjugated Linoleic Acid Modulates Hepatic Lipid Composition in Mice", *Lipids* 32(2) 199–203 (1997).
Chin et al., "Conjugated Linoleic Acid (9,11–and 10, 12–Octadecadienoic Acid) is Produced in Conventional But Not Germ–Free Rats Fed Linoleic Acid", *Nutrient Metabolism*, American Institute of Nutrition 694–701 (1994).
Chin et al., "Conjugated Linoleic Acid is a Growth Factor for Rats as Shown by Enhanced Weight Gain and Improved Feed Efficiency", *Biochemical and Molecular Roles of Nutrients*, American Institute of Nutrition 2344–2349 (1994).
Chin et al., "Dietary Sources of Conjuated Dienoic Isomers of Linoleic Acid, a Newly Recognized Class of Anticarcinogens", *J. Food Composition Analysis* 5:185–197 (1992).
Fogerty et al., "Octadeca–9,11–Dienoic Acid in Foodstuffs and in the Lipids of Human Blood and Breast Milk", *Nutrition Reports International* 38(5): 937–944 (1988).
Gurr, Mike, "A trans Fatty Acid that is Good To Eat? Conjugated Linoleic Acid", *Lipid Technology* 133–135 (1995).
Ha et al., "Inhibition of Benzo($\alpha$)Pyrene–Induced Mouse Forestomach Neoplasia by Conjugated Dienoic Derivatives of Linoleic Acid", *Cancer Research* 50:1097–1101 (1990).
Ip et al., "Mammary Cancer Prevention by Conjugated Dienoic Derivative of Linoleic Acid", *Cancer Research* 51:6118–6124 (1991).
Kammerlehner, J., "Linolsäure und Konjugierte Linolsäuren–ihr Vorkommen im Milchfett, ihre Biologische Bedeuung–" *Milchinhaltsstoffe* 1268–1272 (1995).

(List continued on next page.)

*Primary Examiner*—Anthony J. Weier
*Attorney, Agent, or Firm*—Quarles & Brady LLP

[57] ABSTRACT

An egg enriched for conjugated linoleic acid and having a normal appearance is produced by feeding poultry a diet enriched in conjugated linoleic acid (CLA) and a selected monounsaturated fatty acid. A poultry feed supplemented having conjugated linoleic acid and a selected monounsaturated fatty acid.

9 Claims, 1 Drawing Sheet

OTHER PUBLICATIONS

Lin et al., "Survey of the Conjugated Linoleic Acid Contents of Dairy Products", *J. Dairy Sci.* 78:2358–2365 (1995).

Miller et al., "Feeding Conjugated Linoleic Acid to Animals Patrially Overcomes Catabolic Responses Due to Endotoxin Injection", *Biochem. and Biophy. Research Communications* 198(3):1107–1112 (1994).

Farrell, David J., "UNE's Designer Egg," *Poultry International,* May 62–66 (1993).

Halle, Ingrid, Untersuchungen zum Einfluβ unterschiedlicher Nahrungsfette auf Leistungsparameter und Dotterfettsaurespektrum bei Legehennen, Arch. fur Geflugelkunde, 60:65–72 (1996).

Watkins, et al., "Dietary Modulation of Oleic and Stearic Acids in Egg Yolks," Journal of Food Composition and Analysis, 5:209–215 (1992).

Pariza, M. W., "Conjugated Linoleic Acid, a Newly Recognised Nutrient", *Chemistry and Industry* 464–466 (Jun. 19, 1997).

Pariza, M.W., "CLA, A New Cancer Inhibitor in Dairy Products", *Bulletin of the IDF* 257:29–30 (1991).

Pariza, M.W., "Designer Foods: Effects on Development of Cancer", *J. National Cancer Institute Monographs* 12:105–107 (1992).

Pariza, M.W., "CLA and HEMF: Newly Recognized Anticarcinogenic Antioxidants", in *Active Oxygen, Lipid Peroxides, and Antioxidants,* Yagi, K. editor pp. 359–365, Japan Sci. Soc. Press, Tokyo (1993).

Council on Scientific Affairs, American Medical Association, "Report of the Council on Scientific Affairs: Diet and Cancer: Where Do Matters Stand?", *Arch. Intern Med.,* 153:50–56 (1993).

Sarkar, Gobinda, "Beneficial Ghee?", *Nature* 352(22):673 (1991).

Shantha, N.C. and E.A. Decker, "Conjugated Linoleic Acid Concentrations in Processed Cheese Containing Hydrogen Donors, Iron and Dairy–Based Additives", *Food Chemistry* 47:257–261 (1993).

Shantha et al., "Conjugated Linoleic Acid Concentrations in Dairy Products as Affected by Processing and Storage", *J. Food Science* 60(4): 695–697,720 (1995).

122:131629x, 6001 Chemical Abstracts, 122(11): 972 (1995).

Sieber, R., "Konjugierte Linolsäuren in Lebensmitteln:eine Übersicht: Conjugated Linoleic Acids in Foods: A Review", *Nutrition/Ernährung* 19(6):265–270 (1995).

McGuire et al., "Conjugated Linoleic Acid Concentration of Human Milk and Infant Formulae", *Human Milk and Lactation* 1:3186–3189 (1996).

EGGS ENRICHED WITH CONJUGATED LINOLEIC ACID

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The conjugated linoleic acids (hereinafter, collectively, "CLA"), a set of eight positional and geometric isomers of unconjugated cis-9, cis-12-octadecadienoic acid ("linoleic acid"), exhibit beneficial health effects when consumed in an animal's diet.

The cis-9, trans-11 and, to a lesser extent, the trans-10, cis-12 isomers, as well as other conjugated isomers, occur naturally in food. CLA was first isolated and identified from grilled ground beef extracts that exhibited anticarcinogenic activity (Ha et al., Carcinogenesis 8: 1881–1887, 1987). CLA is also found in some processed cheese products. Y. L. Ha, N. K. Grimm and M. W. Pariza, in J. Agric. Food Chem., Vol. 37, No. 1, pp. 75–81 (1987).

Synthetically prepared CLA inhibits chemically induced carcinogenesis in several animal model systems (Ha et al., 1996 supra; Ha et al., Cancer Res. 50: 1097–1101, 1990; Ip et al., Cancer Res. 51: 6118–6124, 1991; Ip et al., Cancer Res. 54: 1212–1215, 1994). Other biological activities seen in animal model systems include the reduction of adverse catabolic effects induced by immune stimulation (Miller et al., Biochem. Biophys. Res. Comm. 198(3): 1107–1112, 1994) and enhanced growth performance in rats (Chin et al., J. Nutr. 124: 2344–2349, 1994). CLA also reduces the development of atherosclerosis in rabbits (Lee et al., Atherosclerosis, 108: 19–25, 1994) and hamsters (Nicolosi et al., Circulation 88 Suppl: 2458, 1993) fed a high fat atherogenic diet containing cholesterol. It also reduces body fat content and increases lean body mass (Park et al., Abstract for 1995 Annual Meeting of the Institute of Food Technologists, 64–10: 183, 1995, and Park et al., Lipids 32:853-5 (1977)). These effects of CLA seem to be in part a consequence of effects on lipid metabolism.

By increasing the amount of dietary CLA, similar health effects could be realized in humans. One means by which dietary CLA could be increased is to increase the amount of CLA found in foods such as eggs. U.S. Pat. No. 5,504,114, incorporated herein by reference in its entirety, discloses that eggs can be markedly enriched for CLA by administering CLA to laying hens. However, U.S. Pat. No. 5,504,114 further discloses that when birds are fed a diet enriched in CLA their fertile eggs are unhatchable and evidence a dramatic alteration in the lipid profile. The CLA level in the yolk of eggs produced by laying hens fed a CLA-supplemented diet increased more than 20-fold; saturated fatty acids palmitate (16:0) and stearate (18:0) are increased, and monounsaturated fatty acids palmitoleate (16:1) and oleate (18:1) are decreased. The relative percentage of C16:0 and C18:0 increased about 37% and 87%, respectively. The relative percentage of C16:1 and C18:1 decreased about 48% and 41% respectively. The C16:0/C16:1 and C18:0/C18:1 ratios increased approximately 2.4 and 3.2 fold, respectively. In eggs having these changes in fatty acid composition, the egg yolk hardens when cooled to a temperature below room temperature (70° F.), preferably to a temperature between 32° F. and 70° F., more preferably to a temperature between 32° F. and 60° F., and fertile eggs do not hatch when incubated.

In mammals, monounsaturated fatty acids are formed by directly oxidatively desaturating preformed long-chain ($C \geq 16$) saturated fatty acids. Stearoyl-CoA desaturase ("SCD," also known as "Δ9 desaturase") catalyzes the Δ9 desaturation of palmitic (C16:0) and stearic acids (C18:0), forming palmitoleic (C16:1, n-7) and oleic (C18:1, n-9) acids. The desaturase enzyme is associated with the endoplasmic reticulum (microsomes) and can be isolated as microsomes from liver, mammary gland, brain, testes, and adipose tissues.

Many mechanisms may be involved in the process of regulating SCD activity, including dietary deprivation and alteration (Cook and Spence, J. Biol. Chem. 248: 1793–1796, 1973), hormones (Brenner, Biochem. Soc. Trans., 18: 773–775, 1990) and the composition of dietary fat (Christiansen et al., Biochim. Biophys. Acta 1082: 57–62, 1991; Ntambi, J. M., J. Biol. Chem. 267(15): 10925–10930, 1992). Diets rich in polyunsaturated fatty acids typically depress the activity of SCD (Christiansen et al., 1991 supra; de Antueno et al., Mol. Cell. Biochem. 118: 153–161, 1992; de Schrijver and Privett, J. Nutr., 112: 619–626, 1982; Garg et al., Biochem. Biophys. Acta 962: 330–336, 1988). The most convincing evidence indicates that decreases in SCD activity represent decreased enzyme synthesis arising from a reduction in the abundance of SCD1 mRNA (Ntambi, 1992 supra). A fat-free, high carbohydrate diet can increase SCD enzyme synthesis and the level of SCD1 mRNA in the liver (Landschulz et al.,Biochem. Biophys. Res. Comm., 200(2): 763–768, 1994; Ntambi, 1992 supra; Thiede and Strittmantter, J. Biol. Chem., 260: 14459–14463, 1985). Recent studies showed that arachidonic acid (C20:4) regulates monounsaturated fatty acid synthesis by inhibiting stearoyl-CoA desaturase gene expression in lymphocytes (Tebbey and Buttke, Biochim. Biophys. Acta., 1171: 27–34, 1992) and in mouse liver (Landschulz et al., 1994 supra).

It is commercially unacceptable to simply increase the amount of CLA in the diet of laying hens to enhance dietary CLA in eggs, because of the adverse effects that increased CLA levels have both on the ability of birds to reproduce and upon consumer acceptance of the eggs. What is needed in the art is a method for increasing the amount of CLA in eggs without causing undesired reproductive consequences for bird populations while maintaining an acceptable product for human use and consumption.

BRIEF SUMMARY OF THE INVENTION

It is an object of the present invention to provide a method for enhancing the CLA content of eggs without causing a deleterious effect on the eggs.

Accordingly, in one aspect the present invention is a method for enriching the CLA content of eggs without causing undesired effects on the eggs. The method includes the steps of administering to a bird an amount of CLA effective to enrich the level of CLA in an egg laid by the bird to a level higher than the level in an egg laid by a bird not fed a CLA-enriched diet; administering to the bird an amount of one or more unconjugated, unsaturated fatty acids effective to overcome the adverse effects of conjugated linoleic acid on the appearance of an egg laid by a bird fed a CLA-enriched diet, and allowing the laying hen to lay an egg having increased conjugated linoleic acid relative to an untreated egg and a yolk that remains liquid when cooled below room temperature.

In a second aspect, the present invention is also an egg having enhanced levels of CLA relative to eggs that have not been enhanced, wherein the egg has a yolk that remains liquid below room temperature.

In another aspect, this invention is a poultry feed that comprises conjugated linoleic acid and an unconjugated, unsaturated fatty acid that overcomes the adverse effects of conjugated linoleic acid on an egg.

Other objects, advantages, and features will become apparent upon review of the specification, drawings, and claims.

DETAILED DESCRIPTION OF THE INVENTION

Figure 1:
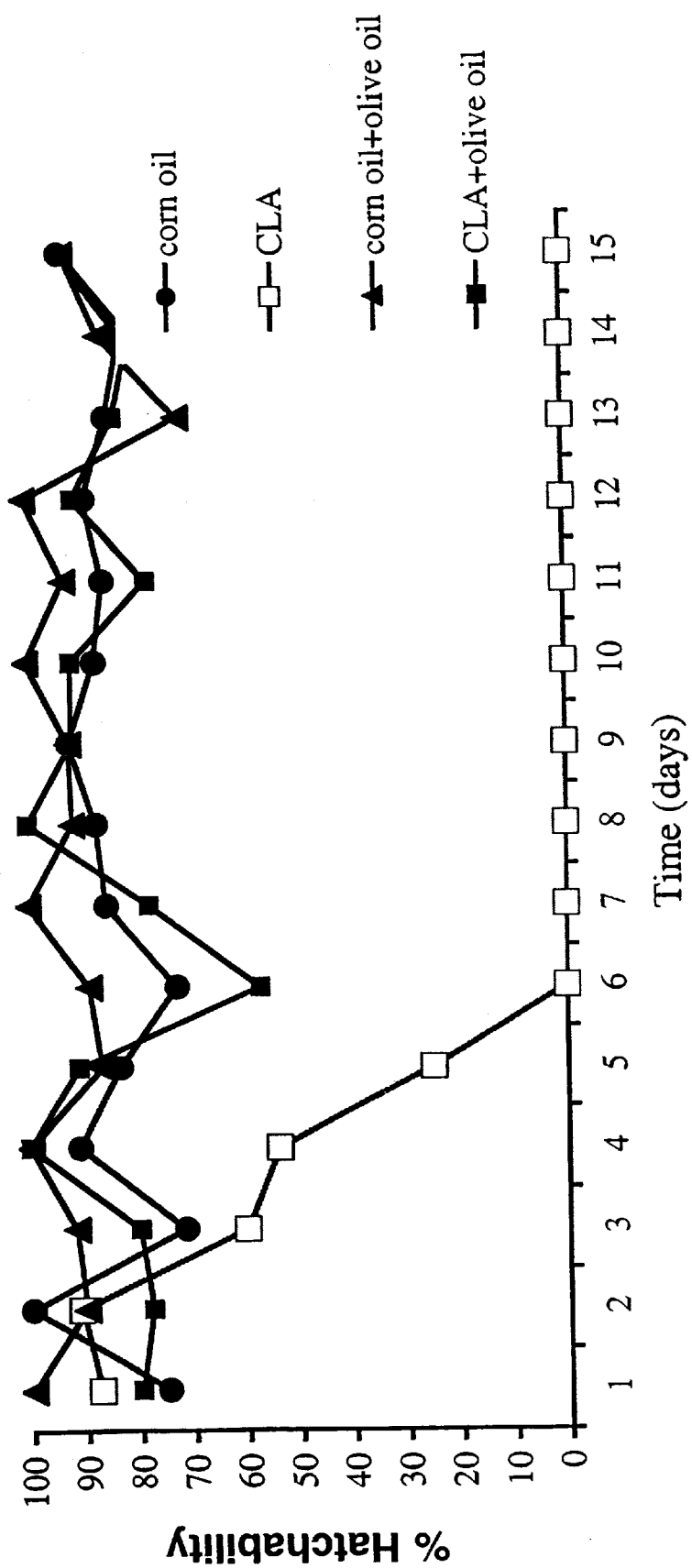
FIG. 1 depicts the effect of the diet of laying hens on the hatchability of eggs laid by the hens.

When CLA is fed to avian species in conventional diets, the fatty acid composition of eggs produced by these birds is altered significantly. U.S. Pat. No. 5,504,114 discloses a shift in the ratios of 16:0/16:1 and 18:0 and 18:1 fatty acids after CLA supplementation. These changes are associated with a reduction in Δ9 desaturase activity (stearoyl CoA desaturase, SCD). Along these lines, CLA supplementation has been correlated with reduced SCD1 mRNA levels in mouse liver in vivo, and in a mouse liver cell line in vitro. U.S. Pat. No. 5,504,114 does not teach any link between CLA supplementation and SCD1 mRNA levels, nor does it teach how to overcome either the shift in ratios or the effects on eggs that follow CLA supplementation.

The present invention is an egg having enhanced levels of conjugated linoleic acid relative to an unenhanced egg, wherein the CLA-enhanced egg does not exhibit the adverse effects previously noted in the yolks of eggs laid by hens fed the CLA-enriched diet of U.S. Pat. No. 5,504,114. An egg having an enhanced level of CLA is one for which more than about 0.08% of its total fatty acids is CLA. Preferably, at least about 1% or 1.5% of the total fatty acids is CLA. Most preferably, as much as or greater than about 2% of the total fatty acids are CLA. The eggs of the present invention having normal appearance are characterized as having a yellow yolk that remains liquid when stored below room temperature. In addition, the ratios of 16:0/16:1 and 18:0/18:1 fatty acids are restored to the ratios seen in eggs lacking enhanced levels of CLA. The ratios of 16:0/16:1 and 18:0/18:1 are altered in eggs having enhanced CLA levels, according to incorporated U.S. Pat. No. 5,504,114. The eggs of the present invention also have a viscosity at 40° F. of about 780 cps, as opposed to the CLA-enhanced eggs of U.S. Pat. No. 5,504,114, which have an elevated viscosity of about 1300 cps. The pH value of the albumen of eggs of the present invention stored for 2 weeks at 60° F. is also between about 8.9 and 9.0. In contrast, CLA-enhanced eggs of U.S. Pat. No. 5,504,114 have a reduced albumen pH of about 8.55. Likewise, the yolk pH of eggs of the present invention is, like "normal" eggs, about 6.0. CLA-enhanced eggs of U.S. Pat. No. 5,504,114 had an elevated yolk pH of about 7.34.

The distribution (by weight) of yolk and albumen in the eggs of the present invention is also typical of "normal", non-CLA-enhanced eggs. The percentage of albumen by weight in the eggs of the present invention is between about 60 and 62%, while the eggs of U.S. Pat. No. 5,504,114 were only about 52% albumen (after storage at 50° F. for 3 months). The percent yolk contents of the eggs of the present invention is about 25–28%, while an elevated percentage (about 35%) of CLA-enhanced eggs of the prior patent was attributable to the yolk.

The invention is also a method for producing the egg, wherein the method comprises the steps of (1) administering CLA to a laying hen in an amount effective to increase the percentage of CLA in eggs laid by the laying hen (as a percentage of total fatty acids) and (2) administering to the laying hen an amount of at least one unconjugated, unsaturated fatty acid effective to counteract the adverse effects that have been noted in CLA-enriched eggs.

By a "laying hen" it is meant a hen that is capable of producing and laying eggs. The laying hens used in the examples were chickens. However, it is reasonably expected that the present invention could be practiced using any avian species whose eggs are desired for human consumption, including turkeys, geese, quails, ducks, ostrich, and so forth.

The CLA can be administered orally in amounts greater than about 0.05% of the diet by weight. At these amounts, the eggs laid by the bird are enriched for CLA (to a level as high as about 90 mg CLA/egg). These amounts also cause the eggs laid by the female bird not to hatch. However, since the conjugated linoleic acids are natural food ingredients and are relatively non-toxic, the amount which can be administered is not critical as long as it is enough to be effective. a preferred amount of CLA is about 0.5% of the diet by weight. Although CLA at about 15% of the diet by weight is a practical upper limit, CLA can be added at an amount higher than 15% without apparent adverse effect on the bird or the egg.

The unconjugated, unsaturated fatty acid is a fatty acid having one or more double bonds. Preferred fatty acids are monounsaturated and polyunsaturated fatty acids, most preferably palmitoleic acid (16:1), oleic acid (18:1), linoleic acid (cis-9, cis-12, 18:2) and linolenic acid [18:3 (n=3 or n=6)]. An effective amount of unconjugated, unsaturated fatty acid in the diet in the present method is between 0.05 and 15% of the diet by weight, preferably about 5% of the diet by weight. The fatty acid can comprise a single fatty acid or mixtures of two or more fatty acids, and can be derived from animal or vegetable sources.

The unconjugated, unsaturated fatty acid or acids can be administered orally in the form of an oil or oils that are high in unconjugated, unsaturated fatty acids. The addition of olive oil, Canola oil, or corn oil to the diet overcomes the effect of CLA on hatchability and egg yolk appearance. Since these oils are rich in the preferred fatty acids, it is anticipated that any oil or fat rich in C16:1, C18:1, or unconjugated C18:2 or C18:3 fatty acids could be used in the practice of the present invention. Table 9—9 of *Nutrient Requirements of Poultry*, Ninth Revised Edition, National Academy Press (1994), incorporated herein by reference in its entirety, lists the percentage of selected fatty acids in various animal and vegetable fats and oils that can be used in poultry feed. Any fat or oil there noted can be used as a source of the desirable unconjugated, unsaturated fatty acid when formulating a suitable animal feed in accordance with the present invention. Preferred oils include corn oil, Canola oil, and olive oil, and mixtures thereof.

The invention is also a feed useful in the method. The feed of the present invention comprises CLA in an amount effective to increase the percentage of CLA in eggs laid by a laying hen (as a percentage of total fatty acids) and an amount of at least one unsaturated, unconjugated fatty acid effective to counteract the adverse effects that have been noted in CLA-enriched eggs. The feed can have the properties of the "bait" described in incorporated U.S. Pat. No. 5,504,114. The feed can be any standard poultry feed supplemented with sufficient CLA and effective fatty acid to achieve the desired fatty acid composition. The animal and vegetable fats and oils noted above in the *Nutrient Requirements of Poultry* Table 9—9, including, but not limited to olive oil, corn oil and Canola oil, are suitable sources of fatty acids.

In the Examples, the feed comprised about 0.5% CLA, and about 1 to 10% olive oil or about 1 to 10% corn oil. This is equivalent to supplementing the feed with approximately 0.1 to 7% oleic acid, about 0.1% palmitoleate, and about 0.1 to 1% linoleate. The Examples further demonstrate that eggs produced by laying hens fed a diet supplemented with CLA and corn oil also did not exhibit egg yolk hardening or reduced hatchability.

The free acid forms of the CLA may be prepared by isomerizing linoleic acid. CLA can be synthesized as described in Example 1 of U.S. Pat. No. 5,504,114. CLA can also be prepared from linoleic acid by the action of a linoleic acid isomerase from a harmless microorganism, such as the rumen bacterium *Butyrivibrio fibrisolvens*. Harmless microorganisms in the intestinal tracts of rats and other monogastric animals may also convert linoleic acid to CLA. S. F. Chin, J. M. Storkson, W. Liu, K. Albright and M. W. Pariza, 1994, J. Nutr. 124:694–701.

The CLA obtained by the practice of the described methods of preparation contains one or more of the 9,11-octadecadienoic acids and/or 10,12-octadecadienoic acids and active isomers thereof. It may be free or bound chemically through ester linkages. The CLA is heat stable and can be used as is, or dried and powdered. The CLA is readily converted into a non-toxic salt, such as the sodium or potassium salt, by reacting chemically equivalent amounts of the free acid with an alkali hydroxide at a pH of about 8 to 9.

The active forms of CLA include, in addition to the free acids, the active isomers of CLA; non-toxic salts thereof; active esters and other active chemical derivatives thereof; and mixtures thereof.

The conjugated positional isomers of CLA are 9,11- and 10,12-octadecadienoic acid. Theoretically, 8 geometric isomers of the two positional isomers would form (c9,c11; c9,t11; t9, c11; t9,t11; c10,c12; c10,t12; t10,c12 and t10, t12). As a result of the isomerization, only four isomers (c9,c11; c9,t11; t10,c12; and c10,c12) would be expected. However, as a result of the co-planar characteristics of 5 carbon atoms around a conjugated double-bond and the spatial conflict of the resonance radical, linoleic acid predominantly produces two isomers, c9,t11- and t10,c12-octadecadienoic acid, when it autooxidizes or undergoes alkali-isomerization. The remaining two c,c-isomers are minor contributors.

The relatively higher distribution of the t,t-isomers of 9,11- or 10,12-octadecadienoic acid apparently results from the further stabilization of c9,t11- or t10,c12-geometric isomers, which is thermodynamically preferred, during an extended processing time or long aging period. Additionally the t,t-isomer of 9,11- or 10,12-octadecadienoic acid that was predominantly formed during the isomerization of linoleic acid geometrical isomers (t9,t12-, c9,t12- and 9,c12-octadecadienoic acid) may influence the final ratio of the isomers or the final CLA content in the samples.

Linoleic acid geometrical isomers also influence the distribution of minor contributors (c,c-isomers of 9,11- and 10,12-, t9,c11- and c11,t12-octadecadienoic acids). The 11,13-isomer might be produced as a minor product from c9,c12-octadecadienoic acid or from its isomeric forms during processing.

The terms "conjugated linoleic acids" and "CLA" as used herein are intended to include 9,11-octadecadienoic acid, 10,12-octadecadienoic acid, mixtures thereof, and the non-toxic salts of the acids. The non-toxic salts of the free CLA acids may be made by reacting the free acids with a non-toxic base.

One wishing to produce an egg comprising increased CLA may begin to feed the laying hens a CLA and C18:1 or C16:1 fatty acid supplemented diet about 1–7 days prior to egg collection. Preferably, the CLA- and the unsaturated fatty acid-supplemented diet is fed to the laying hens at least about 7 days prior to egg collection.

The following nonlimiting examples are intended to be purely illustrative.

Examples

Effect of Diet on Eggs

Four groups of 15 laying hens were fed diets supplemented with 0.5% corn oil, 0.5% CLA, 0.5% corn oil and 10% olive oil, or 0.5% CLA and 10% olive oil. Whereas the eggs produced by hens fed CLA-supplemented diets are characterized by hard yolks and a red color, these adverse effects to the eggs are counteracted when CLA-fed hens also receive supplementary mono- or polyunsaturated fatty acids in the diet.

In addition to the improved yolk characteristics, the addition of the mono- or polyunsaturated fats in the diet also counteracts the reduced hatchability of fertilized eggs produced by hens fed a CLA-supplemented diet. Whereas the hatchability of eggs produced by hens fed CLA-supplemented diets are drastically reduced, supplementation of the diet of CLA-fed hens with 10% olive, corn or Canola oil counteracts the effect of CLA on hatchability (Table 1 and FIG. 1). Beginning on day one of the initiation of dietary supplementation, fertilized eggs were collected and incubated under suitable incubation conditions. The percentages of eggs that ultimately hatched were determined for each group and for each day of collection.

TABLE 1

| | % Total Hatchability | | | |
|---|---|---|---|---|
| Day of Feeding | Corn Oil Group | CLA Group | Corn Oil + Olive Oil Group | CLA + Olive Oil Group |
| 1 | 71.43 | 87.5 | 100.0 | 100.0 |
| 2 | 100.0 | 90.9 | 90.0 | 77.7 |
| 3 | 71.43 | 60.0 | 91.67 | 80.0 |
| 4 | 90.91 | 53.85 | 100.0 | 100.0 |
| 5 | 83.33 | 25.0 | 86.67 | 90.91 |
| 6 | 72.73 | 00.0 | 88.89 | 57.14 |
| 7 | 85.71 | 00.0 | 100.0 | 77.78 |
| 8 | 87.5 | 00.0 | 91.67 | 100.0 |
| 9 | 92.31 | 00.0 | 92.31 | 91.67 |

It will be readily apparent to those skilled in the art that a number of modifications or changes may be made without departing from the spirit and scope of the present invention.

What is claimed is:

1. An egg comprising conjugated linoleic acid as at least about 0.08% of total fatty acid in the egg and having a yolk that remains liquid when cooled to a temperature above 32° F. and below room temperature.

2. An egg as claimed in claim 1, the egg being produced by a method comprising the steps of:

administering CLA to a laying hen in an amount effective to increase the percentage of CLA as a percentage of total fatty acids in eggs laid by the laying hen to at least about 0.08%;

administering to the laying hen an amount of at least one unsaturated fatty acid effective to produce an egg having a yolk that remains liquid when cooled to a temperature above 32° F. and below room temperature; and allowing the laying hen to lay an egg having conjugated linoleic acid as at least about 0.08% of total fatty acids and a yolk that remains liquid when cooled to a temperature above 32° F. and below room temperature.

3. An egg as claimed in claim 1 having a liquid yolk when cooled to a temperature between 32° F. and 60° F.

4. An egg as claimed in claim 1 wherein at least 1% of the total fatty acids is conjugated linoleic acid.

5. An egg as claimed in claim 1 wherein at least 1.5% of the total fatty acids is conjugated linoleic acid.

6. An egg as claimed in claim 1 wherein the yolk is yellow.

7. An egg as claimed in claim 1 having a liquid yolk at 60° F. wherein at least 1% of the total fatty acids is conjugated linoleic acid.

8. An egg as claimed in claim 1 having a 16:0/16:1 fatty acid ratio of an egg lacking enhanced CLA level.

9. An egg as claimed in claim 1 having a 18:0/18:1 fatty acid ratio of an egg lacking enhanced CLA level.

* * * * *